March 11, 1958 — W. G. GRINNELL ET AL — 2,826,090
BOAT STEERING CONTROLS
Filed Jan. 27, 1955
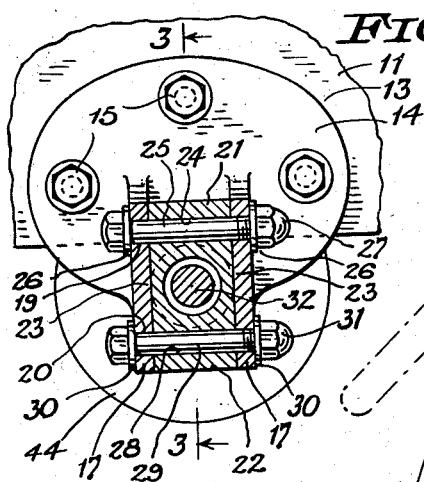
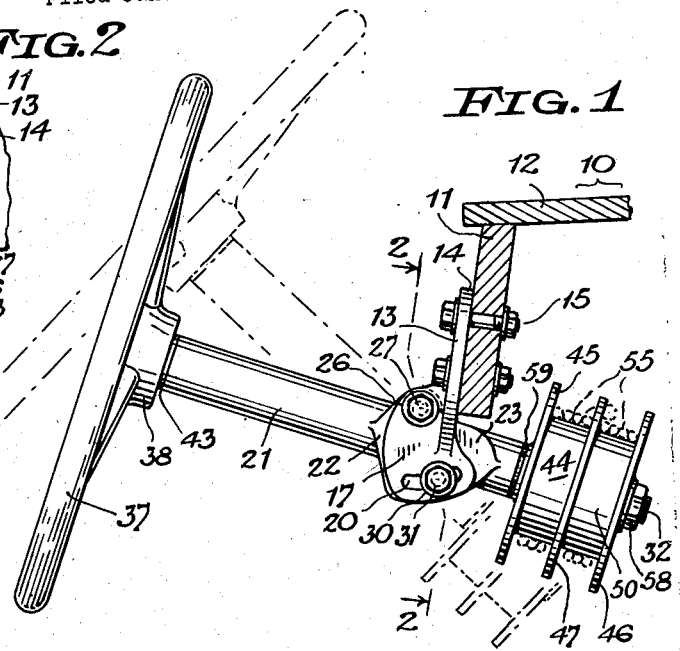
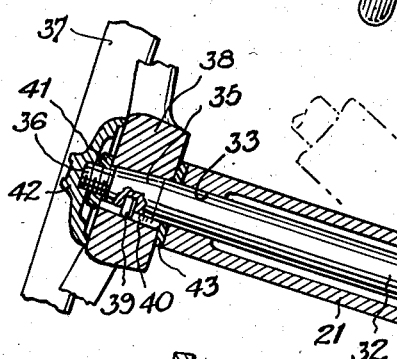
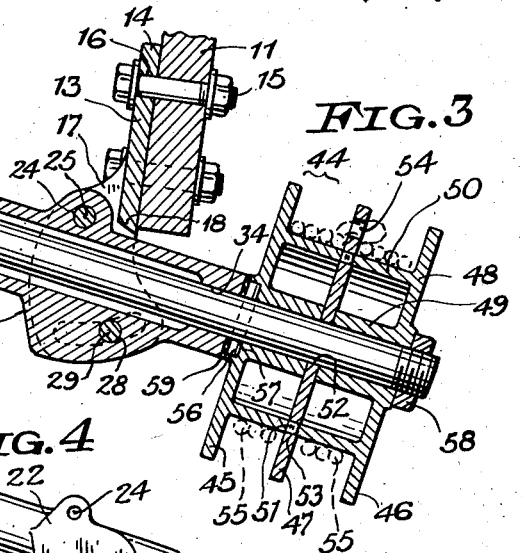
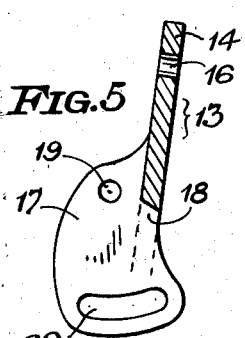
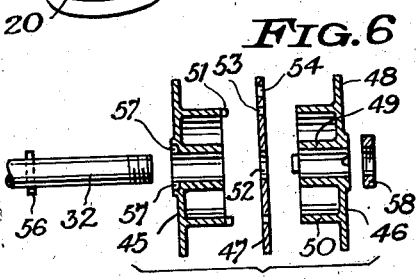
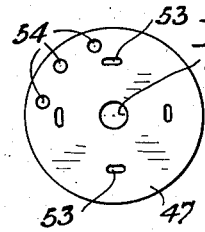
INVENTORS
WILLIAM G. GRINNELL
AND HARRY L. DORMANN
BY Christopher L. Naal
ATTORNEY 2,826,090

United States Patent Office

Patented Mar. 11, 1958

2,826,090

BOAT STEERING CONTROLS

William G. Grinnell and Harry L. Dormann, West Allis, Wis., assignors to Supreme Foundry, Inc., West Allis, Wis., a corporation of Wisconsin Application January 27, 1955, Serial No. 484,346

5 Claims. (Cl. 74—493)

The present invention relates to boat steering mechanism and more particularly to steering controls.

An object of the invention is to provide an improved steering device or control adapted to be readily mounted on a boat, such as an outboard or inboard motor boat, and including a steering wheel the elevation of which can be easily and quickly adjusted from time to time to suit the convenience of different operators.

Another object is to provide a boat steering control which is of simple, rugged and durable construction, which is capable of inexpensive manufacture, and which is easily assembled and installed.

The invention further consists in the several features hereinafter described and claimed.

In the accompanying drawing,

Fig. 1 is a side elevation of a mounted boat steering control constructed in accordance with the invention, a mounting portion of the boat being shown in section, and a raised position of a steering wheel of the device being shown in broken lines;

Fig. 2 is a transverse sectional view of the mounted steering control, taken generally on the line 2—2 of Fig. 1;

Fig. 3 is a longitudinal vertical sectional view of the steering control, taken generally on the line 3—3 of Fig. 2;

Fig. 4 is a detail side elevation of a steering column or tube of the device;

Fig. 5 is a detail vertical sectional view of a mounting bracket, taken in the same plane as Fig. 3;

Fig. 6 is an exploded vertical sectional view of a double-sheave drum and steering shaft, and Fig. 7 is a detail face view of a divider disk member of the winding drum.

In the drawing, 10 designates a boat, such as an outboard or inboard motor boat, having a cross member or dash board 11. In some instances, the cross member constitutes a cross beam for a boat deck 12.

A mounting bracket 13, such as of a cast aluminum alloy, includes a flat mounting plate 14 which is rigidly secured to the rearward face of the dash board 11, as by bolts 15 passing through openings 16 in the plate. The bracket 13 has formed integrally thereon a pair of laterally spaced, flat vertical ears or flanges 17 which project downwardly from the plate 14, the planes of the ears extending at right angles to the plane of the plate. The ears also project forwardly and rearwardly from the plane of the plate, and between the ears the lower edge of the plate is cut away at 18, the lower portion of the eared bracket presenting a downwardly forked configuration. A pair of aligned horizontally extending bolt openings 19 are formed in the upper portions of the ears rearward of the plate 14, the axis of the openings being parallel to the plate. A pair of aligned arcuate slots 20 are formed in the lower portions of the ears and are concentric with the bolt openings 19.

A steering column or tube 21, such as of a cast aluminum alloy, extends between the ears 17 in a vertical fore-and-aft plane and includes a vertically enlarged intermediate portion 22 presenting parallel, flat vertical faces or pads 23 at opposite sides extending close to the inner flat faces of the bracket ears 17. The intermediate tube portion 22 is provided at its upper region with a transverse horizontal opening or bore 24 aligned with the bolt openings 19 formed in the bracket ears. A pivot and clamping bolt 25 extends through the aligned openings 19 and 24 and is provided with clamping washers 26 and a cap nut 27. The intermediate tube portion 22 is provided at its lower region with a horizontal opening or bore 28 parallel to the bore 24 and aligned with the arcuate slots 20 formed in the bracket ears. A clamping bolt 29 extends through the slots 20 and bore 28 and is provided with clamping washers 30 and a cap nut 31. The two parallel upper and lower bolts 25 and 29 are arranged at opposite sides of the longitudinal axis of the steering column and at a considerable distance apart. The steering column is swingable in a vertical plane about the pivot bolt 25, and is held in angularly adjusted position by the bolt 29. Preferably the pivot bolt 25 is also clamped so as to enhance the clamping action and to avoid looseness and rattling.

A steering shaft 32 extends axially through the steering column or tube 21 and is journalled in bearings 33 and 34 formed in the opposite end portions of the column. The steering shaft has a tapered upper or rear end 35 with a reduced screw-threaded extension 36. A steering wheel 37 has an apertured hub portion 38 fitting on the tapered shaft end 35 and is keyed thereon, as by a radial pin 39 in the shaft fitting in a key groove 40 in the wheel hub. A nut 41 on the shaft extension 36 clamps the wheel hub on the tapered shaft end. The nut 41 is concealed by an ornamental cap 42 which is threaded onto the shaft extension. A spring washer 43, such as a Belleville spring, is interposed between the wheel hub and the adjacent end of the steering column.

The projecting lower or front end of the steering shaft rigidly carries thereon an actuator in the form of a double-sheave winding drum designated generally by 44. The drum comprises a pair of opposed coaxial drum sections or sheave members 45 and 46 and an interposed divider disk 47. The drum sections 45 and 46 may be identical, and each includes a disk-like end wall 48 with a cylindrical hub 49 and a surrounding concentric cylindrical flange 50. The hub 49 fits on the steering shaft, and the flange 50 is provided with a pair of opposed axially projecting lugs 51. The intermediate disk 47 is provided with a central opening 52 slidably receiving the shaft 32 therethrough and with a circular series of slots 53 which receive the drum section lugs 51 to interlock the drum sections and the disk. The disk is further provided with openings 54 for anchoring the ends of tiller ropes 55 which are wound around the drum. The steering shaft is provided with a cross pin or drive key 56 which fits in cross grooves or pockets 57 formed diametrically in the end face of the upper or rear drum section 45. A nut 58 is screwed onto the front end of the steering shaft to fasten the steering drum onto the shaft. A fiber thrust washer 59 is interposed between the front end of the steering column and the adjacent drum section. During assembly of the device, tightening of the nut 41 on the rear end of the steering shaft will press the steering wheel hub 38 onto the shaft and also compress the spring washer 43, thus removing end play.

The steering control is installed on the boat by rigidly bolting the bracket plate 14 against the dash board 11. The tiller ropes 55 are secured to the drum disk 47 and are wound about the drum sections or sheaves. These ropes extend laterally from the drum toward opposite sides of the boat, as usual, and are connected in tensioned condition in any customary manner to the outboard motor or rudder, not shown.

During installation of the steering control the pivotally mounted steering column 21 is adjusted to a suitable inclination which will place the steering wheel at an elevation convenient for the operator, and the steering column is then locked in adjusted position by the clamping bolts 25 and 29 which extend transversely of the column. Without disturbing the mounting bracket 13, the angular position of the steering column can be easily and quickly readjusted from time to time for raising or lowering the steering wheel to suit the convenience of different operators.

We claim:

1. A boat steering control comprising a mounting bracket having a pair of laterally spaced parallel flanges forming a downwardly opening fork, a tubular member extending between said flanges with its axis parallel said flanges, said tubular member having parallel flat vertical faces at opposite sides confronting the inner faces of said flanges, a steering shaft extending longitudinally in said tubular member and rotatable therein, a steering wheel secured to the rear end of the shaft, an actuator secured to said shaft to be turned thereby, a pivot bolt extending transversely through said tubular member above said shaft and also extending through said bracket flanges, and a releasable clamping bolt extending transversely through said tubular member below said shaft and also extending through said flanges, said clamping bolt urging said flanges laterally against said tubular member for retaining said tubular member in angularly adjusted position to vary the height of the steering wheel.

2. A boat steering control comprising a mounting bracket having a pair of laterally spaced parallel flanges with apertures therein, said flanges being resilient and forming a downwardly opening fork, a tubular member extending between said flanges and having an intermediate enlargement with flat parallel faces at opposite sides confronting the inner faces of said flanges, the axis of said tubular member being parallel to said flanges, a steering shaft extending longitudinally in said tubular member and rotatable therein, a steering wheel secured to the rear end of said shaft, an actuator secured to said shaft to be turned thereby, a pair of parallel horizontal bolts extending transversely through said tubular member at said enlargement and disposed at opposite sides of said shaft, said bolts also extending through said apertured flanges, one of said bolts forming a pivot member about which said tubular member is angularly adjustable in a vertical plane to adjust the elevation of said steering wheel, and means for releasably tightening the other bolt for laterally clamping said resilient bracket flanges against said tubular member to retain said tubular member in angularly adjusted position.

3. A boat steering control comprising a mounting bracket having a pair of laterally spaced parallel flanges, said flanges having aligned pivot openings and aligned arcuate slots concentric with said openings, a tubular member extending between said flanges and having opposite parallel side faces engageable therewith, the axis of said tubular member being parallel to said flanges, a steering shaft extending longitudinally in said tubular member and rotation therein, a steering wheel secured to the rear end of said shaft, an actuator secured to said shaft to be turned thereby, a pivot member extending transversely in said tubular member and extending in said pivot openings, a clamping member extending transversely in said tubular member and extending in said arcuate slots, said pivot member and clamping member being parallel and disposed at opposite sides of said shaft, and releasable clamping means engaging said clamping member for holding said tubular member in angularly adjusted position on said bracket flanges.

4. A boat steering control comprising a mounting member adapted to be rigidly secured to a boat, a tubular support pivotally carried on said mounting member to turn on a generally horizontal axis through a range of angular movement, a steering shaft rotatable in said support and extending longitudinally therein in a generally fore-and-aft direction, a steering wheel secured to the rear end of said shaft for turning said shaft, an actuator secured to said shaft to be turned thereby, and releasable retaining means for holding said support in any angularly adjusted position in said range of movement to vary the elevation of said steering wheel.

5. A boat steering control comprising a mounting bracket including an apertured mounting plate adapted to be secured to a boat dash board or the like, the plane of said plate extending in an up-and-down direction, said plate having integrally formed thereon a pair of laterally spaced parallel flanges projecting downwardly from the plate and forming a fork, the planes of said flanges being vertical and at right angles to the plane of said plate, and said plate having portions extending along the outer sides of said flanges, said flanges having aligned pivot openings the axis of which extends at right angles to said flanges, and said flanges further having aligned arcuate slots lower than and concentric with said pivot openings, a tubular member extending between said spaced flanges and having parallel flat vertical faces at opposite sides confronting the inner faces of said flanges, a steering shaft extending longitudinally in said tubular member and rotatable therein, a steering wheel secured to the rear end of said shaft, an actuator secured to said shaft to be turned thereby, a horizontal pivot bolt extending transversely through said tubular member above said shaft and also extending through said pivot openings, and a releasable clamping bolt extending transversely through said tubular member below said shaft and also extending through said arcuate slots, said clamping bolt urging said flanges laterally against the opposite flat side faces of said tubular member for retaining said tubular member in angularly adjusted position to vary the height of the steering wheel.

References Cited in the file of this patent

UNITED STATES PATENTS

| | | |
|---|---|---|
| 761,223 | Hall | May 31, 1904 |
| 987,728 | Liwentaal | May 28, 1911 |
| 1,474,103 | Belden | Nov. 13, 1923 |

U. S. DEPARTMENT OF COMMERCE
PATENT OFFICE

CERTIFICATE OF CORRECTION

Patent No. 2,826,090                               March 11, 1958

William G. Grinnell et al.

It is hereby certified that error appears in the printed specification of the above numbered patent requiring correction and that the said Letters Patent should read as corrected below.

Column 4, line 2, for "rotation" read -- rotatable --.

Signed and sealed this 29th day of April 1958.

(SEAL)
Attest:
KARL H. AXLINE

Attesting Officer

ROBERT C. WATSON
Commissioner of Patents